(12) United States Patent
Whipp et al.

(10) Patent No.: US 12,651,029 B2
(45) Date of Patent: *Jun. 9, 2026

(54) USING FRAMES FOR ACTION DIALOGS

(71) Applicant: GOOGLE LLC, Mountain View, CA (US)

(72) Inventors: David P. Whipp, San Jose, CA (US); David Kliger Elson, Brooklyn, NY (US); Shir Judith Yehoshua, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/361,450

(22) Filed: Jul. 28, 2023

(65) Prior Publication Data

US 2023/0367832 A1     Nov. 16, 2023

Related U.S. Application Data

(63) Continuation of application No. 17/122,906, filed on Dec. 15, 2020, now Pat. No. 11,714,870, which is a
(Continued)

(51) Int. Cl.
G06F 16/9538          (2019.01)
G06F 3/16          (2006.01)
(Continued)

(52) U.S. Cl.
CPC .......... G06F 16/9538 (2019.01); G06F 3/167 (2013.01); G06F 16/243 (2019.01);
(Continued)

(58) Field of Classification Search
CPC .. G06F 16/9538; G06F 16/243; G06F 16/953; G06F 16/3329; G06F 16/9535;
(Continued)

(56) References Cited

U.S. PATENT DOCUMENTS 5,685,000 A * 11/1997 Cox, Jr. .................. G10L 15/22
                                                  704/E15.04
7,613,610 B1   11/2009 Zimmerman et al.
(Continued)

FOREIGN PATENT DOCUMENTS

EP          1045373  B1    10/2000
EP          1187007  A1     3/2002
WO      2006129968  A1    12/2006

OTHER PUBLICATIONS

European Patent Office; Summons to Attend Oral Proceeding Pursuant to Rule 115(1) EPC in Application No. 15791095.1; 9 pages; dated Jun. 25, 2020.
(Continued)

*Primary Examiner* — Kannan Shanmugasundaram
(74) *Attorney, Agent, or Firm* — Gray Ice Higdon

(57)          ABSTRACT

Methods, systems, and apparatus, including computer programs encoded on computer storage media, for using frames for performing tasks. One of the methods includes receiving a first request to perform a task, the first request comprising user speech identifying the task; generating a frame associated with the task, wherein the frame comprises one or more types of values necessary to perform the task, and wherein each type of value can be satisfied by a respective value; receiving a second request to provide information related to a question, the second request comprising user speech identifying the question; providing information identifying the question to a search engine, and receiving a response identifying one or more terms; determining that at least one term can satisfy a type of value necessary to perform the task; and storing the at least one term in the frame.

20 Claims, 2 Drawing Sheets

Related U.S. Application Data continuation of application No. 14/881,778, filed on Oct. 13, 2015, now Pat. No. 10,885,129.

(60) Provisional application No. 62/090,093, filed on Dec. 10, 2014.

(51) Int. Cl.

| | |
|---|---|
| *G06F 16/242* | (2019.01) |
| *G06F 16/3329* | (2025.01) |
| *G06F 16/953* | (2019.01) |
| *G06F 16/9535* | (2019.01) |
| *G06F 16/9536* | (2019.01) |
| *G10L 15/18* | (2013.01) |
| *G10L 15/22* | (2006.01) |
| *H04M 3/493* | (2006.01) |

(52) U.S. Cl.

CPC ........ *G06F 16/3329* (2019.01); *G06F 16/953* (2019.01); *G06F 16/9535* (2019.01); *G06F 16/9536* (2019.01); *G10L 15/1822* (2013.01); *G10L 15/22* (2013.01); *H04M 3/4936* (2013.01); *G10L 2015/223* (2013.01)

(58) Field of Classification Search

CPC .. G06F 16/9536; G06F 3/167; H04M 3/4936; G10L 15/22; G10L 15/1822

See application file for complete search history.

(56) References Cited

U.S. PATENT DOCUMENTS

| | | | |
|---|---|---|---|
| 8,478,769 B2 | 7/2013 | Goldfarb | |
| 8,560,567 B2 | 10/2013 | Azzam et al. | |
| 8,577,671 B1 * | 11/2013 | Barve | G06F 16/84 |
| | | | 715/752 |
| 8,612,233 B2 | 12/2013 | Anand et al. | |
| 8,639,517 B2 | 1/2014 | Di Fabbrizio et al. | |
| 2002/0133355 A1 | 9/2002 | Ross et al. | |
| 2002/0138266 A1 * | 9/2002 | Ross | G10L 15/1822 |
| | | | 704/E15.044 |
| 2004/0088285 A1 | 5/2004 | Martin et al. | |
| 2004/0143440 A1 | 7/2004 | Prasad et al. | |
| 2009/0162824 A1 | 6/2009 | Heck | |
| 2012/0117005 A1 | 5/2012 | Spivack | |
| 2013/0115927 A1 * | 5/2013 | Gruber | G06F 16/243 |
| | | | 455/414.1 |
| 2013/0185336 A1 * | 7/2013 | Singh | G06F 16/3344 |
| | | | 707/E17.127 |
| 2013/0275875 A1 | 10/2013 | Gruber et al. | |
| 2014/0081633 A1 * | 3/2014 | Badaskar | G06F 16/587 |
| | | | 707/723 |
| 2014/0310001 A1 | 10/2014 | Kalns et al. | |
| 2014/0365227 A1 * | 12/2014 | Cash | G06F 16/9537 |
| | | | 704/275 |
| 2015/0045003 A1 * | 2/2015 | Vora | H04M 1/64 |
| | | | 455/412.2 |
| 2015/0142704 A1 | 5/2015 | London | |
| 2015/0373183 A1 | 12/2015 | Woolsey et al. | |

OTHER PUBLICATIONS

European Patent Office; Office Action issue in European Application No. 15791095.1; 6 pages; dated Jul. 24, 2019.

Bobrow et al.; "Gus, a frame-driven dialog system," Artificial Intelligence, Elsevier Science Publisher B.V., Amsterdam, NL, 8(2): 155-173; dated Apr. 1, 1977.

International Search Report and Written Opinion issued in International Application No. PCT/US2015/056200; 13 pages; mailed Feb. 4, 2016.

International Preliminary Report on Patentability issued in International Application No. PCT/US2015/056200; 8 pages; mailed Jun. 13, 2017.

* cited by examiner

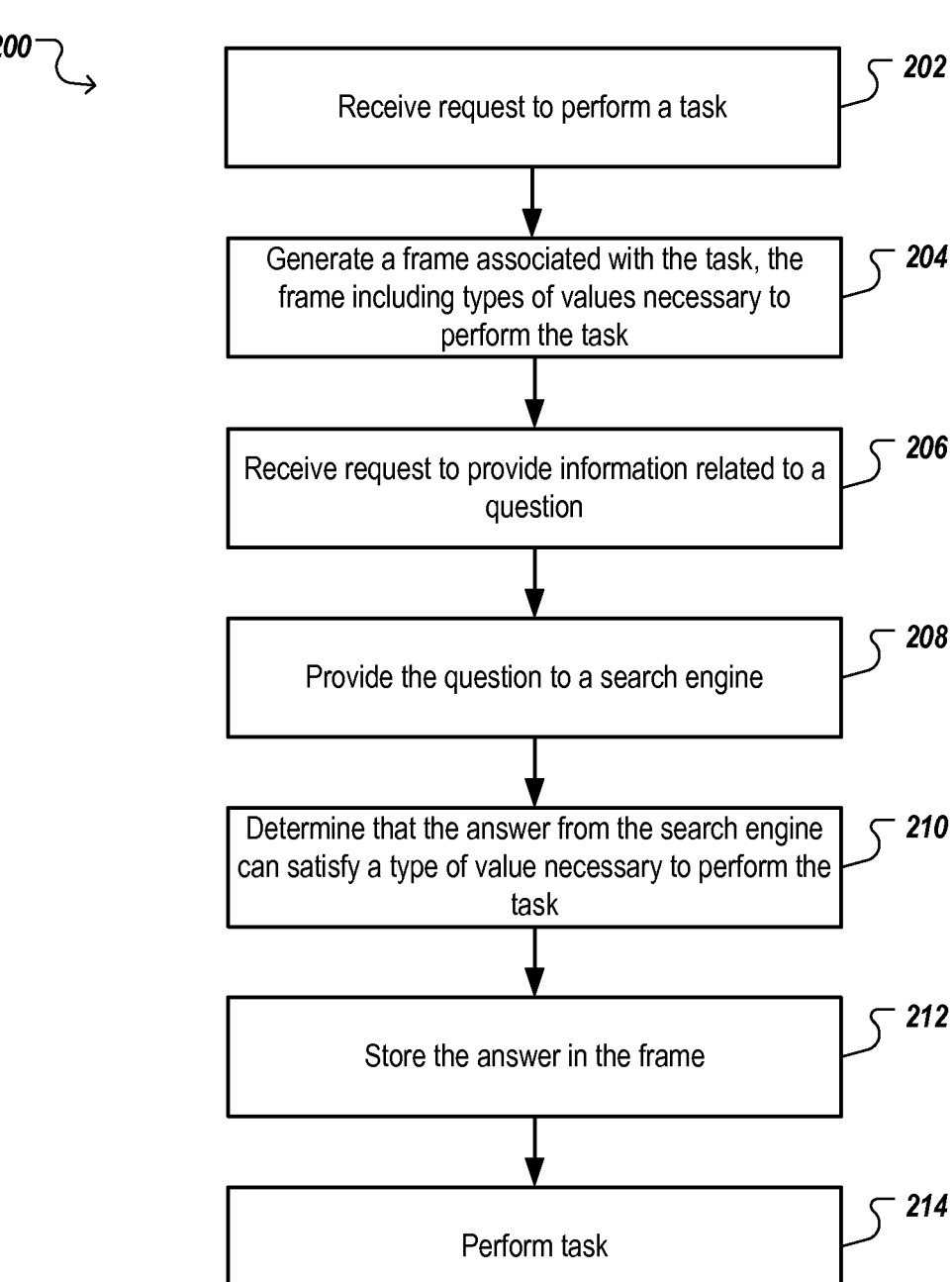

200

Receive request to perform a task — 202

Generate a frame associated with the task, the frame including types of values necessary to perform the task — 204

Receive request to provide information related to a question — 206

Provide the question to a search engine — 208

Determine that the answer from the search engine can satisfy a type of value necessary to perform the task — 210

Store the answer in the frame — 212

Perform task — 214

FIG. 2

USING FRAMES FOR ACTION DIALOGS

BACKGROUND

Conventional mobile devices can include software to respond to speech of a user of the mobile device. The speech can typically include instructions to the mobile device to call a phone number, text a phone number, or search for information on the mobile device or the Internet. The software can provide audio output from the mobile device confirming the instructions, or can ask for clarifying information to complete an instruction. The mobile device can provide the received speech to a server system for processing, and receive information identifying operations to perform.

SUMMARY

In general, one innovative aspect of the subject matter described in this specification can be embodied in methods that include the actions of receiving a first request to perform a task, the first request comprising user speech identifying the task; generating a frame associated with the task, wherein the frame comprises one or more types of values necessary to perform the task, and wherein each type of value can be satisfied by a respective value; receiving a second request to provide information related to a question, the second request comprising user speech identifying the question; providing information identifying the question to a search engine, and receiving a response identifying one or more terms; determining that at least one term can satisfy a type of value necessary to perform the task; and storing the at least one term in the frame. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The method further includes: obtaining information identifying a question template for the at least one term; providing audio information identifying the question template; and receiving a confirmation of the at least one term, the confirmation comprising user speech. Determining that at least one term can satisfy a type of value necessary to perform the task includes: determining that the type of a value necessary to perform the task is a same type as a type associated with the at least one term. The method further includes: applying a filtering process to the at least one term to assign a probability that the at least one term can satisfy the type of value necessary to perform the task. The method further includes: filtering the at least one term if the assigned probability is below a threshold. A type of a value comprises: a date, a time, a location, a phone number, a user name, a web address, or a person's name. A task comprises: a reminder, a calendar event, a request for information, or a request for directions. Receiving a response includes: receiving, from the search engine, the response identifying information comprising respective terms related to a respective question of two or more questions, each question including a different meaning of one or more terms in the question; providing a disambiguation question, wherein the disambiguation question comprises audio information identifying the different meanings; and receiving a response comprising user speech identifying a selection of a particular meaning. The method further includes: in response to receiving a second request, generating a different frame associated with the second request. The method further includes determining that each of the one or more type of values have been obtained; and performing the task.

Particular embodiments of the subject matter described in this specification can be implemented so as to realize one or more of the following advantages. A system can better understand that multiple statements received in a conversation with a user are related. The system can receive user speech identifying that the user wishes the system to perform a task, e.g., create a calendar event, or search for information. The system can then receive a question from the user and better understand that the answer to the question relates to the task. In this way the system can infer the context of the question asked, and use the answer in the performance of the task.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process of using frames for dialogs.

Like reference numbers and designations in the various drawings indicate like elements.

DETAILED DESCRIPTION

Figure 1:
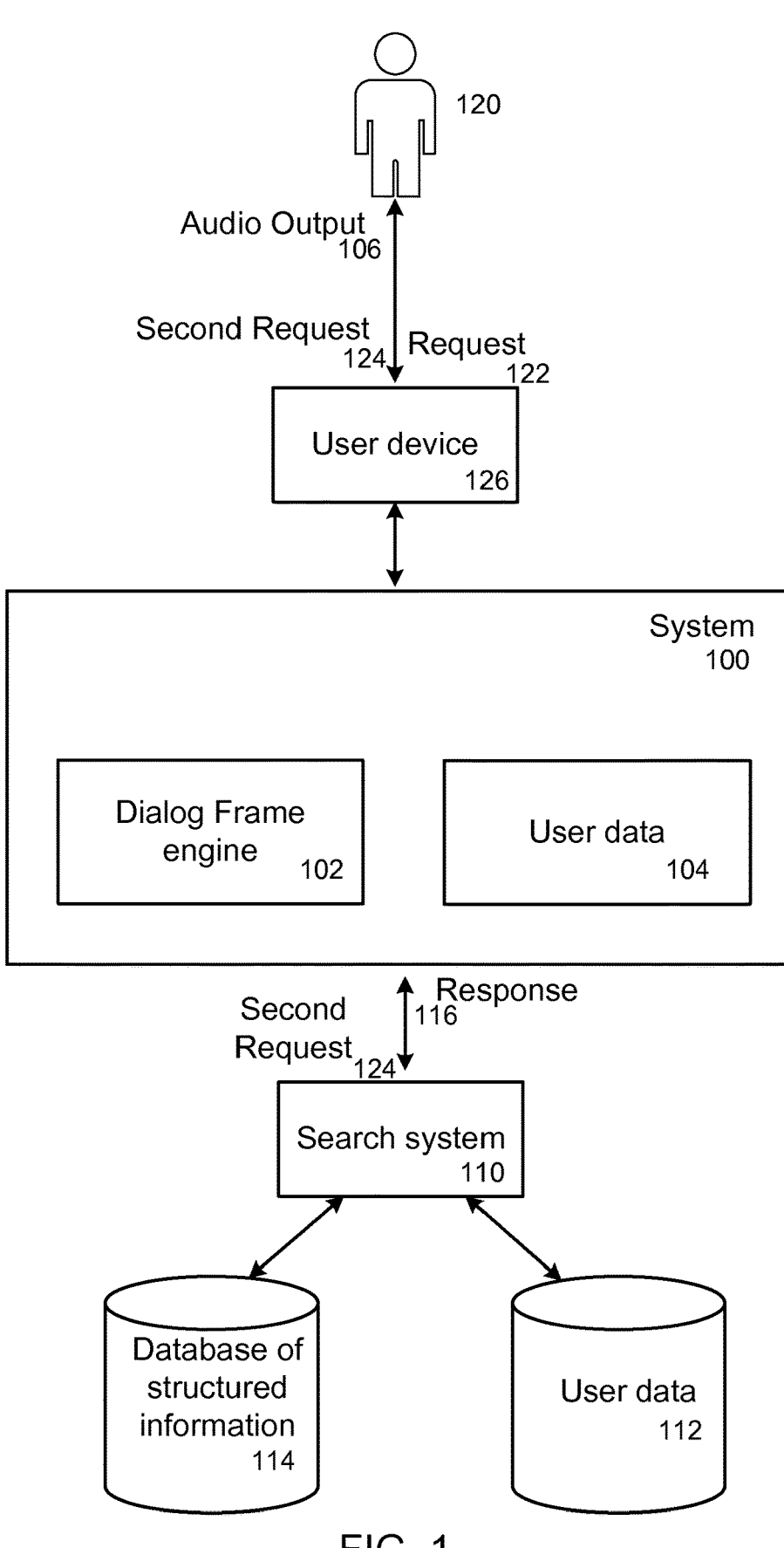
FIG. 1 is an example system for using frames for dialogs.

Users can provide voice instructions to a device to perform a particular task or action, for example, generating a calendar item, place a call or text, or search for particular information. Performing the task, by the device or by a system in communication with the device, can be driven by a dialog that asks the user questions for one or more values needed to complete the task, analogous to filling out fields of a form. This specification describes a conversational dialog in which a user can answer a question by asking another question that is associated with the relevant information of the received question. The answer to that question can be used as the corresponding value of the one or more values needed for completing the task.

For example, a sample dialog for a calendar task can be:
User: [create a meeting with Dave tomorrow]
Device/system: What time?
User: [When am I free tomorrow afternoon?]
Device/system: You are free tomorrow from 2 μm to 3 pm: should I schedule your meeting for then?
Another sample dialog for a calendar task can be:
User: [create a meeting with Dave]
Device/system: For when?
User: [When do the Giants play next?]
Device/system: The Giants play the Dodgers at 7:15 tomorrow. Should I schedule your meeting for then?
In some implementations, the initial user request can be structured so that the device/system obtains information, for example, from a search system or user data. For example, the calendar task can be constructed as:

User: [add and event to meet my mother at the Coffee Spot on Valencia Street]

Device/system: *obtains the address for the Coffee Spot on Valencia Street using a search system* What time?

User: [what time is my last work appointment on Tuesday?]

Device/system: *obtains user calendar data to determine appointments on Tuesday* The last work appointment is 2:00-2:30 pm on Tuesday. Should I schedule your meeting for 2:30?

When a user requests a particular task to be performed, a frame is generated for the task. When the user responds to a question for a value needed to complete the task, a new frame can be generated for responding to the question. Techniques for using frames to compete tasks are described in detail below.

FIG. 1 is an example system 100 for using frames for dialogs. The system 100 can be one or more computing resources, e.g., one or more computing systems, or virtual machines executing on one or more computing systems, in communication with a search system 110, and a user device 126. The user device, e.g., a mobile device, a wearable computer, a tablet, a hybrid, a laptop, receives interactions with a user 120, e.g., verbal interactions.

The user device 126 can receive audio from the user 120, e.g., user speech received by a microphone in the user device 126, identifying a request 122 to perform a task. In some implementations, a suitable speech-to-text process is used to convert the received audio into a text string. The user device 126 can parse the audio to identify one or more meanings, e.g., by generating a parse tree, and provide the parsed audio as the request 122 to the system 100. Alternatively, the user device can provide the audio, e.g., speech from the user, to the system 100, and the system 100 can parse the audio to identify the request 122. The request 122 identifies the task, e.g., generate a calendar event, generate a reminder, provide information to the user, and so on.

The system 100 includes, or communicates with, a dialog frame engine 102. The dialog frame engine 102 receives the request 122 to perform a task and generates a frame identifying the task. Frames are data structures that represent particular states of dialog by the system 100 with the user 120, and identify values necessary to fulfill a user intended purpose of the state of dialog. For instance, if the system 100 receives a request for information about an actor's height, the system 100 can generate a frame representing the question. The frame can identify that a height value, e.g., a number, is needed to respond to the question. The system 100 can provide the question to a search engine and receive a response identifying a height value. Upon receipt of the height value, the system 100 can store the value in the generated frame, and determine that all types of values in the frame have been satisfied, e.g., have received values. The system 100 can then provide the value as a response to the user 120.

Each request by the user 120 to perform a task, can be associated with one or more frames. That is, the dialog frame engine 102 can generate a frame for the task, and additional frames associated with particular values necessary to perform the task. For example, if the request 122 is to generate a calendar event, the dialog frame engine 102 can generate a frame for the request 122 and additional frames representing whether the user 126 has provided and in some instances confirmed a date, a time, a location, and so on. These additional frames can be associated with the frame for the request, e.g., the additional frames can be child frames of the frame for the request.

The system 100 can store templates of frames for each task, with each frame including one or more types of values necessary to perform the task. For instance, if the dialog frame engine 102 receives a request to generate a calendar event, the dialog frame engine 102 can obtain a frame for the task of a calendar event. The obtained frame can include types of values necessary for a calendar event, e.g., a date of the event, a name of the event, a time of the event, and so on. As described above, each type of value necessary can be associated with a separate frame that identifies the respective type of value. In this way the system 100 can keep track of types of values that still need values necessary to perform the task.

The request 122 can identify one or more of the values necessary to perform the task. For instance, the user 120 can identify that he/she wants to generate a calendar event and identify a subject of the calendar event and a location. The system 100 can provide each value, e.g., the subject and the location, to a respective frame, e.g., a child frame of the frame for the task, associated with a same type of value. The frames can then provide information identifying the respective value and that the value has been satisfied, e.g., received, to the frame for the task. The system 100 can then remove the satisfied frame, e.g., destroy the frame, and the frame for the task can store the values received in the request 122.

The user device 126 can receive speech from the user 120 that identifies a second request 124, and provide the second request 124 to the system 100. The second request 124 can be received in response to a prompt associated with the first request 122. For example, in response to the first request 122 to create a calendar event, the resulting dialog prompt, e.g., a question for the user, can be a prompt for a date/time of the calendar event. The second request 124 can be a request to perform a second task, e.g., a request for information. The second request 124 can be seemingly unrelated to the first request 122. For instance, the first request 122 can identify that the user 120 wants to create a calendar event. The second request 124 can identify a request for information about the President's birthday.

As will be described below, the dialog frame engine 102 can determine that the seemingly unrelated second request 124 can include a value in an answer to the request 124, e.g., the Presidents birthday, that can satisfy a type of value necessary to perform the task, e.g., a calendar date. In other words, the system determines that the type of information received in the answer is the same type of value in response to the dialog question of the frame. For example, a first request frame may require a date value as a response. The second request, while not specifying a date, results in a date from the response. For example, the second request [when is Labor Day?] results in a date value response. This value matches the type of value of the first request and therefore the two requests are related.

In some other implementations, relatedness of the requests can be based on whether the second request can be inferred by the system as relating to the information requested in the frame for the first request. The second request in this scenario may not be a query or question, but instead be a statement or assertion. The system can determine the link between the statement/assertion and the information necessary for the first frame. For example, in response to a dialog frame requesting a time for an appointment task, the user could respond with the statement [I need to renew my passport in the morning]. The system infers the relationship between the second request (the statement) and the first request. The system can determine the nearest passport office and their opening times, e.g., using a search system. The opening time can then be the basis for responding to the request in the frame of the first request. The system can then respond to the statement with, for example, "the nearest passport office opens at 8:00 am. Schedule your appointment for then?"

Other features can be used in some implementations to determine relatedness of requests. For example, the system can use explicit rules activated by the context derived from the prior questions that an utterance is related. The system can determine relatedness if the response can be explicitly connected to the prior dialog prompt of the first request.

In some implementation, relatedness cannot be determined. For example, the answer to the second request may not include context that connects the answer to a value needed for the first request. Alternatively, the second request may be garbled or otherwise unintelligible. In the former case, the answer can be provided along with a repeat dialog question associated with the first request. In the latter case, the system can assume that the user was misheard dialog question associated with the first request can be repeated without supplying any answer to the second request.

In response to determining that the requests are related, the system 100 can then provide information to the user device 126 to prompt the user 120 to confirm that the answer for second request 124 includes a value to be used for the task, e.g., the calendar event should be set for the President's birthday. The system 100 can generate a second frame for the second request 124, e.g., a request for information. This frame can include one or more types of values necessary to request information, e.g., the question, and an answer to the question.

The system 100 can then provide the second request 124 to a search system 110 that can obtain the requested information.

The search system 110 can determine whether the second request 124 is a request for information associated with the user 120, e.g., e-mail contacts of the user 120, phone numbers of contacts of the user 120, locations the user has been to, and so on.

The search system 110 can then access user data 112 associated with the user. For instance, the user data 112 can store information identifying a calendar of the user 120, e.g., calendar events associated with the user 120, e-mail contacts of the user 120, reminders for the user 120, and so on. The search system 110 can obtain an answer to the request for information, and provide a response 116 identifying the answer to the system 100.

Additionally, the search system 110 can determine that the second request 124 is a request for general knowledge. In this case the search system can obtain a response 116 to the second request 124 from a database of structured information 114. The database 114 can include multiple nodes that each identify a particular subject, e.g., a person, a city, a movie, with each node connected to one or more other nodes by an edge representing a relationship between the subjects. For instance, a first node can identify an actor, a second node can identify a movie, and an edge can connect the nodes that identifies that the actor appeared in the movie. The search system 110 can obtain information identifying an answer to the second request 124 from the database 114.

The search system 110 can also provide the second request 124 to a search engine to obtain search results related to the second request 124. The search results can be scanned by the search engine to determine a response to the second request. For instance the search engine can identify proper nouns that appear most often in resources, e.g., web pages, associated with the search results.

Furthermore, the second request 124 can be a request for information related to both user data 112, and general knowledge. For instance, the user can ask how close his/her friend is from a particular library. The search system 110 can obtain information identifying a location of the friend, e.g., from user data 112, and also a location of the library, e.g., from the database 114.

Therefore, the search system 110 can obtain the requested information, and provide a response 116 identifying the information to the system 100. The system 100 receives the response 116, and the dialog frame engine 102 determines whether the information identified in the response 116 can satisfy a type of value necessary to generate the task. For example, the task can be to generate a calendar event, and the second request 124 can be a question asking when a particular movie is playing. The response 116 received from the search system 110 can identify a date and time that the movie is playing. The dialog frame engine 102 can determine that the date and time identified in the response 116 can satisfy a type of value necessary to perform the task, e.g., a date and time.

In some implementations, each frame associated with a particular type of value necessary to perform the task, e.g., a child frame, can determine whether the response 116 can satisfy the particular type of value. Upon a positive determination, the second frame can provide information to the frame for the task identifying the value and that the type of value has been satisfied.

In determining that the a value received in the response 116 can satisfy a type of value necessary to perform the task, the dialog frame engine 102 can filter values that satisfy the type of value but that are unlikely to relate to the task. For instance, the dialog frame engine 102 can execute a machine learning model that assigns a probability that the value received in the response 116 is likely to be acceptable to the user 120 as a value for the task. The machine learning model can identify one or more rules to be applied to the value received in the response 116. For example, if a date received in the response 116 is before the present day, a rule can be applied that filters responses prior to the present day.

After the dialog frame engine 102 determines that the value received in the response can satisfy a type of value for the task, the system 100 can provide information to the user device 126 to provide audio output 106 confirming the value with the user 120. In some implementations, the system 100 can obtain templates of questions to ask the user 120 based on the specific type of value received in the response 116, e.g., a template for a date, a template for a time, a template for a name, and so on.

The user 120 can then confirm to the user device 126 that the value received in the response 116 is acceptable, e.g., properly satisfies the task. The system 100 can then store the value in the frame for the task, and prompt the user for any remaining types of values in the frame that are necessary to perform the task. After receiving values for all necessary types of values, the system 100 can perform the task. The system can store information identifying the task in user data 104 associated with the user 120.

FIG. 2 is a flowchart of an example process 200 of using frames for dialogs. The process 200 will be described as being performed by an appropriately programmed system of one or more computers, e.g., the system 100.

The system receives a request to perform a task (step 202). The system can receive audio of speech provided to a user device of a user. The system can parse the speech to determine a task that the user is requesting be performed, and any values associated with the task. For instance, if the task is to generate a calendar event, the speech can identify values including a location and subject of the event.

The system is configured to perform a multitude of tasks for the user, e.g., create a calendar event for the user's personal or business calendar, create a reminder, get directions to a location, or provide information related to a subject.

The system generates a frame associated with the task (step 204). The system generates a data structure for the task that identifies one or more types of values necessary to perform the task, e.g., names, dates, times, weights, locations, and so on. As described above, a frame represents a particular state of the dialog the user is engaging in with the user device. The system further generates frames for each type of value included in the frame associated with the task. These frames can be child frames of the frame for the task, and upon receipt of a value that satisfies a type of value in a child frame, the child frame can provide the value to the frame for the task and be removed, e.g., deleted, destroyed, by the system. In this way the system can determine the types of values still needed to perform the task.

In some implementations, each frame can be associated with a particular task. After receiving the request to perform the task, the system can then obtain information identifying an associated frame. In some implementations, the system can determine a frame from the received request. For instance, in a request for information about the location of a store, the system can generate a frame with a location as a type of value. Additionally, the system can automatically generate one or more additional frames, e.g., to request information related to the task from the user, or to confirm information related to the task with the user.

After generating the frame, the system can prompt the user for a value that can satisfy a type of value necessary to perform the task. For instance, if the task if to create a calendar event, the system can prompt the user to identify a date and time for the calendar event.

The system receives a request to provide information related to a question (step 206). The system receives audio of speech from the user that identifies the question. The system then generates a frame associated with this request for information.

In some implementations, the system can obtain a subject of the question, and the type of information requested about the subject. For instance, the system can determine a form of the question by matching the question to different patterns of questions. The system can determine whether the question is of the form "How [type of information sought] is [subject]?", or 'What is the [type of information sought] of [subject]?' After determining a form of the question, the system can generate a frame that includes two types of values necessary to perform the task, e.g., the type of information sought, and the subject of the question.

The system provides the question to a search engine (step 208). The system provides the question to an outside system, e.g., the search engine, that can determine an answer to the question.

In some implementations, the search engine provides the subject of the question, and the information to be sought by the user, to a database of structured information. The database of structured information includes a multitude of nodes that identify respective subjects, with nodes connected to other nodes by edges identifying relationships between the subjects. The search engine can identify a node for the subject of the question, and obtain information of the type sought by the user.

In some implementations, the search engine can obtain search results for the question, and identify information likely to be related to the question. For instance, the search engine can search for the subject of the question in resources associated with search results, and identify information appearing near the subject that relates to the question. After identifying information that might relate to the question, the system can determine the highest occurrence of particular information as being the likely answer.

Additionally, the search engine can search user data associated with the user for an answer to the question. For instance, the user data can include information identifying the user's schedule, upcoming reminders, locations the user has been, restaurants the user has been to, user profiles of friends at one or more social networks, e-mail addresses, phone numbers, and so on. For example, the requested task can be a calendar entry. The question, in response to the task value for when to start the calendar event, can be [when am I free next week?]. The search engine can identify that the user is requesting information that implicates user data, and obtain information from the user data to answer the question.

In some cases, a term in the question provided can be ambiguous, e.g., have two or more meanings. Therefore, the search engine might obtain information related to two or more questions. In these cases the search engine can determine answers to both questions, and the system can provide a disambiguation question to the user. The disambiguation question can be of the form, 'Do you mean [first term] or [second term].' For example, the question can be [what time does the game start?], which may be ambiguous if there are multiple sports having games. The disambiguation question can be, for example, "which game?" or "which sport?" After receiving a response, the system can store the answer related to the correct meaning.

The system determines that the answer from the search engine can satisfy a type of value necessary to perform the task (step 210). The system receives a response from the search engine that identifies an answer to the question.

The system then determines whether the answer can satisfy a type of value necessary to perform the original task. The system determines whether the type of information received in the answer is the same type of value necessary to perform the task. For instance, if the user originally requested that the system perform a task to provide directions, then the user asked a question about where his/her Aunt lives, the system can determine that the location of the user's Aunt can satisfy a type of value necessary for providing directions, e.g., a location.

To determine that the type of information received in the answer is the same type of value necessary to perform the task, the system can perform a pattern matching process. That is, the system can determine whether the answer includes any units, e.g., pounds, kilograms, or whether the answer is of a particular form, e.g., an address, a date, and so on. Additionally the search engine can provide information identifying a type of information.

In some implementations, the system can apply a machine learning model to filter answers that are likely to not be satisfactory to a user. The machine learning model, e.g., a k-means clustering process, linear discriminant analysis process, can apply one or more rules to characterize the answer, e.g., apply a label to the answer. Additionally the machine learning model can provide a confidence value, e.g., a probability that the label is correct. If the confidence value is below a threshold, e.g., 70%, 78%, 85%, the system can determine that the answer does not satisfy a type of value necessary to perform the task. The machine learning model can be trained on training data, and provided to the system for storage.

The system stores the answer in the frame associated with the task (step 212). The system prompts the user to identify whether the answer, e.g., one or more terms of the answer, should be stored in the frame associated with the task. The system can obtain templates of questions based on the task and the type of value, and prompt the user with the question, e.g., 'do you want [answer] to be the location?', 'Do you want the calendar event to be set for [answer]?'

The system then receives a response from the user identifying whether the answer is satisfactory. If the answer is satisfactory the system stores the answer in the frame, satisfying the associated type of value. If the answer is not satisfactory, the system can prompt the user for an answer to the type of value, and store the answer in the frame.

The system can repeat the process for additional values needed to perform the task. Once all the values for the task have been entered, e.g., in response to user input or a user confirmation of input values, the system can perform the task, or provide information to the mobile device identifying the task for the mobile device to perform (step 214).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:

generating, based on user interface input provided at a user device, a first inquiry associated with a calendar application;

causing, based on the first inquiry, a frame to be generated specifying one or more types of values necessary to respond to the first inquiry;

generating, based on additional user interface input provided at the user device subsequent to receiving the first inquiry, a second inquiry associated with a request for particular information of the calendar application associated with the first inquiry;

causing, based on the second inquiry, generation of a plurality of results responsive to the request for the particular information;

determining, based on processing the plurality of results, that one or more of the plurality of results, that are caused to be generated based on the second inquiry, provide at least one value corresponding to one or more of the types of values necessary to respond to the first inquiry specified by the frame;

storing, in the frame associated with the first inquiry, the at least one value that was provided by the one or more of the plurality of results, wherein storing the at least one value is responsive to determining that the one or more of the plurality of results responsive to the second inquiry, associated with the request for particular information of the calendar application associated with the first inquiry, provides the at least one value corresponding to the one or more types of values specified by the frame associated with the first inquiry; and causing a response to the first inquiry to be rendered based on the at least one value stored in the frame.

2. The method of claim 1, further comprising:

identifying, prior to generating the second inquiry, an ambiguity associated with one or more terms of the additional user interface input;

causing a disambiguation question identifying the different meanings to be provided to the user;

receiving further user interface input identifying a particular meaning associated with the terms responsive to the disambiguation question; and generating, based on the additional user interface input provided at the user device subsequent to receiving the first inquiry and the further user interface input, the second inquiry associated with the request for information of the calendar application.

3. The method of claim 1, wherein the first inquiry is associated with a time of the calendar application and the one or more types of values include at least one of: a separate time associated with the calendar application.

4. The method of claim 1, wherein the one or more types of values include at least one of: a calendar event associated with the calendar application.

5. The method of claim 1, further comprising:

identifying, prior to storing the at least one value that was provided by the one or more of the plurality of results, a natural language question template associated with the at least one value;

causing, based on the natural language question template, a natural language question to be provided to the user via the user device; and storing, in the frame associated with the first inquiry and based further on another user interface input responsive to the natural language question, the at least one value.

6. The method of claim 1, further comprising:

determining, prior to storing the at least one value that was provided by the one or more of the plurality of results, that the one or more of the plurality of results provides at least one additional value corresponding to one or more of the types of values specified by the frame;

determining respective confidence levels for the at least one value and the at least one additional value based on one or more rules; and storing, in the frame associated with the first inquiry, the at least one value based further on the respective confidence levels.

7. The method of claim 1, wherein causing a response to the first inquiry to be rendered based on the at least one value stored in the frame, further comprises:

generating a calendar event associated with the calendar application; and rendering a prompt for the user to schedule the calendar event.

8. The method of claim 1, wherein causing a response to the first inquiry to be rendered based on the at least one value stored in the frame, further comprises:

generating a reminder associated with the calendar application; and causing the user to be prompted to set the reminder.

9. A system comprising:

one or more computers and one or more storage devices storing instructions that are operable, when executed by the one or more computers, to cause the one or more computers to perform operations, the operations comprising:

receiving a first inquiry, wherein the first inquiry comprises natural language input from a user identifying a calendar application associated with the first inquiry;

in response to receiving the first inquiry:

generating a frame associated with the first inquiry, wherein the frame specifies one or more types of values necessary to respond to the first inquiry; and receiving, subsequent to receiving the first inquiry, a second inquiry comprising a request by the user for a search system to access user data of the calendar application associated with the first inquiry;

in response to receiving the second inquiry:

causing the search system to execute a search over the user data based on the second inquiry;

receiving, based on the search, a plurality of results from the search system; and determining, that one or more of the plurality of results that are caused to be generated based on the second inquiry provide at least one value corresponding to one or more of the types of values necessary to respond to the first inquiry;

storing, in the frame associated with the first inquiry, the at least one value, wherein storing the at least one value is responsive to determining that one or more of the plurality of results, determined in response to receiving the second inquiry comprising the request by the user for the search system to access user data of the calendar application associated with the first inquiry, provide the at least one value corresponding to one or more of the types of values necessary to respond to the first inquiry; and causing a response to the first inquiry to be rendered based on the at least one value stored in the frame.

10. The system of claim 9, the operations further comprising:

identifying, prior to causing the search system to execute a search over the user data based on the second inquiry, an ambiguity associated with the second inquiry;

causing a disambiguation inquiry identifying ambiguous meanings of one or more terms of the second inquiry to be provided to the user;

receiving a disambiguation response identifying a particular meaning associated with the terms responsive to the disambiguation inquiry; and causing the search system to execute a search over the user data based further on the disambiguation response.

11. The system of claim 9, wherein the one or more types of values include at least one of: a date, a time, a location, a phone number, a user name, a web address, and/or a person's name.

12. The system of claim 9, wherein the response to the first inquiry comprises: setting a reminder, scheduling a calendar event, providing information, and/or providing directions.

13. The system of claim 9, the operations further comprising:

identifying, prior to storing the at least one value that was provided by the one or more of the plurality of results, a question template for the at least one value;

causing the question template to be provided for presentation to the user via the user device; and storing, in the frame associated with the first inquiry, the at least one value, based further on a response, received by the user, to the natural language question.

14. The system of claim 9, the operations further comprising:

determining, prior to storing the at least one value that was provided by the one or more of the plurality of results, that the one or more of the plurality of results provides at least one additional value corresponding to one or more of the types of values specified by the frame;

determining respective confidence levels for the at least one value and the at least one additional value based on one or more rules; and storing, in the frame associated with the first inquiry, the at least one value based further on the respective confidence levels.

15. The system of claim 9, wherein the operations are locally performed at a client computer of the user having a graphical user interface.

16. The system of claim 9, wherein the operations are remotely performed at a server.

17. One or more non-transitory computer-readable storage media encoded with instructions that, when executed by one or more computers, cause the one or more computers to perform operations, the operations comprising:

generating, based on user interface input provided at a user device, a first inquiry associated with a calendar application;

causing, based on the first inquiry, a frame to be generated specifying one or more types of values necessary to respond to the first inquiry; and generating, based on additional user interface input provided at the user device subsequent to receiving the first inquiry, a second inquiry associated with a request for information of the calendar application associated with the first inquiry;

causing, based on the second inquiry, generation of a plurality of results responsive to the request for information; and determining, based on processing the plurality of results, that one or more of the plurality of results, that are caused to be generated based on the second inquiry, provide at least one value corresponding to one or more of the types of values necessary to respond to the first inquiry specified by the frame;

storing, in the frame associated with the first inquiry, the at least one value that was provided by the one or more of the plurality of results, wherein storing the at least one value is responsive to determining that the one or more of the plurality of results responsive to the second inquiry provides the at least one value corresponding to the one or more types of values specified by the frame associated with the first inquiry; and causing a response to the first inquiry to be rendered based on the at least one value stored in the frame.

18. The one or more non-transitory computer-readable storage media of claim 17, wherein the operations are locally performed at a client computer of the user having a graphical user interface.

19. The one or more non-transitory computer-readable storage media of claim 17, wherein the operations are remotely performed at a server.

20. The one or more non-transitory computer-readable storage media of claim 17, wherein a first set of the operations are locally performed at a client computer of the user having a graphical user interface, and a second set of the operations are remotely performed at a server.

\* \* \* \* \*